United States Patent
Watanabe (10) Patent No.: US 9,678,226 B2
(45) Date of Patent: Jun. 13, 2017

(54) RADIOGRAPHIC IMAGE DETECTOR

(71) Applicant: FUJIFILM Corporation, Minato-Ku, Tokyo (JP)

(72) Inventor: Keita Watanabe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/755,449

(22) Filed: Jun. 30, 2015

(65) Prior Publication Data

US 2015/0301200 A1  Oct. 22, 2015

Related U.S. Application Data

(62) Division of application No. 13/239,741, filed on Sep. 22, 2011, now Pat. No. 9,097,811.

(30) Foreign Application Priority Data

Sep. 28, 2010 (JP) .................. 2010-216754

(51) Int. Cl.
*G01T 1/24* (2006.01)
*H04N 5/32* (2006.01)

(52) U.S. Cl.
CPC .............. *G01T 1/247* (2013.01); *G01T 1/243* (2013.01); *H04N 5/32* (2013.01)

(58) Field of Classification Search
CPC .................................................. G01T 1/247
See application file for complete search history.

(56) References Cited

U.S. PATENT DOCUMENTS

| 6,797,960 B1 | 9/2004 | Spartiotis et al. |
| 6,801,598 B2 | 10/2004 | Tashiro et al. |
| 2002/0101527 A1 | 8/2002 | Endo |
| 2003/0086523 A1 | 5/2003 | Tashiro et al. |
| 2008/0288740 A1 | 11/2008 | Gaerber |

FOREIGN PATENT DOCUMENTS

| JP | 2002-181942 A | 6/2002 |
| JP | 2002-543684 U | 12/2002 |
| JP | 2003-126072 A | 5/2003 |
| JP | 2008-507796 A | 3/2008 |
| JP | 2012-070201 A | 4/2012 |

OTHER PUBLICATIONS

Notification of Reasons for Refusal, dated Jul. 3, 2013, issued in corresponding JP Application No. 2010-216754, 11 pages in English and Japanese.

*Primary Examiner* — Edwin Gunberg
(74) *Attorney, Agent, or Firm* — Sughrue Mion, PLLC (57) ABSTRACT

A flat panel detector (FPD) includes an imaging panel having pixels arranged in a matrix, a gate driver for turning thin film transistors (TFTs) of the pixels ON and OFF, a radiation detecting section for detecting the start of x-ray radiation from the x-ray source, and a controller. The controller controls the gate driver to turn the TFTs ON periodically to reset dark charges of the pixels. Before starting a charge accumulating operation for accumulating signal charges for imaging, the controller controls the gate driver to turn the TFTs OFF so that the radiation detecting section may detect the start of x-ray radiation on the basis of charge leaks from the pixels. When the start of x-ray radiation is detected, the controller starts the charge accumulating operation while keeping the TFTs in the OFF condition. Thereafter, the TFTs are turned ON to read out the accumulated signal charges.

12 Claims, 9 Drawing Sheets

RADIOGRAPHIC IMAGE DETECTOR

CROSS REFERENCE TO RELATED APPLICATIONS

This is a Divisional of U.S. application Ser. No. 13/239,741 filed Sep. 22, 2011, which claims benefit of Japanese Patent Application No. 2010-216754 filed Sep. 28, 2010. The above-noted applications are incorporated herein by reference in their entirety.

BACKGROUND OF THE INVENTION

1. Field of the Invention

The present invention relates to a radiographic image detector that detects an image of a subject from radioactive rays penetrating through the subject.

2. Description of the Related Art

In the medical field, radiography using radioactive rays like x-rays has been well known as a diagnostic method. An x-ray radiography system generally consists of an x-ray source for radiating x-rays, and an x-ray image detector for detecting an x-ray image of a subject from x-rays penetrating through the subject. Among those used practice, there is an x-ray image detector that adopts a flat panel detector (FPD) having a TFT (thin film transistor) active matrix substrate, in which pixels having a thin film transistor (TFT) each are arranged in an array for accumulating signal charges in the respective pixels corresponding to the incident amounts of the x-rays. The FPD outputs the accumulated signal charges in the form of digital image data representative of the x-ray image of the subject. There are also x-ray image detectors that use a radiographic film or an imaging plate.

Unlike these image detectors, the FPD type x-ray image detector should be controlled to synchronize its charge accumulating operation with the time of x-ray radiation from the x-ray source. For this purpose, a control device for the x-ray image detector, like a console, is configured to receive a start-of-radiation signal from a radiation starting switch when the radiation starting switch is operated to actuate the x-ray source to start x-ray radiation. The control device transfers the start-of-radiation signal as a synchronizing signal to the x-ray image detector, upon which the x-ray image detector starts accumulating signal charges for imaging.

However, the x-ray image detector may be equipped with such interfaces that are incompatible to interface standards (standards of cables and connectors, format of the synchronizing signal, etc.) of the control device for the x-ray source of the radiography system, for example, because of different manufacturers. To solve this problem, various methods of detecting the start of x-ray radiation from the x-ray source by the x-ray image detector itself in order to synchronize it with the x-ray source have been suggested.

In an x-ray image detector disclosed in United States Patent Application Publication No. 2002/101527 (corresponding to Japanese Patent Laid-Open Publication No. 2002-181942), a detection element for detecting the start of x-ray radiation is disposed outside an imaging area in which pixels are arranged in a matrix. The output of the detection element is monitored to detect the start of x-ray radiation.

United States Patent Application Publication No. 2003/086523 (corresponding to Japanese Patent Laid-Open Publication No. 2003-126072) discloses an x-ray image detector that has a radiation detecting element for detecting the start of x-ray radiation is disposed in an area of the FPD where x-rays from an x-ray source enter without penetrating through the test subject. The start of x-ray radiation is determined based on a surge in output of the radiation detecting element.

An x-ray image detector disclosed in U.S. Pat. No. 6,797,960 (corresponding to Japanese Patent Translation Publication No. 2002-543684) predetermines a threshold value with regard to dark charges which will be accumulated in pixels due to dark current generated in the FPD even without incidence of x-rays. This x-ray image detector compares the accumulated charges with the predetermined threshold value to judge that the x-ray radiation is started when the accumulated charges get over the threshold value.

United States Patent Application Publication No. 2008/288740 (corresponding to Japanese Patent Laid-Open Publication No. 2008-507796) discloses an x-ray image detector that reads out image data periodically at a predetermined frame rate in advance to the start of x-ray radiation. Depending on whether differences in pixel level between two successive image frames are above a threshold level or not, the start of x-ray radiation is determined in this prior art.

The detection method suggested in United States Patent Application Publication No. 2002/101527 (corresponding to Japanese Patent Laid-Open Publication No. 2002-181942), however, has a problem that the detection element disposed outside the imaging area may be out of an irradiation range by the x-rays when it is confined within the imaging area. In that case, the detection element cannot detect the x-rays from the x-ray source so that the FPD will not start the charge accumulating operation even after the start of x-ray radiation. As a result, the image detector cannot detect any x-ray image while the test subject is exposed to the x-rays wastefully.

According to other detection methods of the above-mentioned prior arts, at least a pixel inside the imaging area is utilized for detecting the start of x-ray radiation. Therefore, these prior arts do not have the same problem as the first mentioned prior art. However, because the signal charges accumulated upon the x-ray radiation must be read out from the pixels in order to detect the start of x-ray radiation, the x-rays radiated in a first stage of a radiation time will be used merely for detecting the start of radiation and will not be served for imaging. This is a waste of x-rays.

SUMMARY OF THE INVENTION

In view of the foregoing, the present invention has an object to provide a radiographic image detector that can detect the start of radiation of radioactive rays from a remote radiation source without any signal from the radiation source or other external devices, while utilizing radiated rays fully for imaging.

A radiographic image detector of the present invention comprises an imaging device, a driving device, a radiation detecting device and a control device, wherein the radiation detecting device makes a radiation detecting operation for detecting the start of radiation of radioactive rays from a radiation source by monitoring charge leaks from pixels to signal lines of the imaging device while switching elements of the pixels are OFF. The amounts of charge leaks correspond to the dark charges and the signal charges accumulated in the pixels, and the control device controls the radiation detecting device and the driving device to start the radiation detecting operation by turning the switching elements OFF before starting charge accumulating operation for accumulating the signal charges in the pixels, and to start the charge accumulating operation while keeping the switching elements OFF after the radiation detecting device detects the start of radiation of the radioactive rays.

The imaging device detects a radiographic image of a subject from radioactive rays that penetrate through the subject after being radiated from the radiation source. The imaging device has an imaging area in which the pixels are arranged in a matrix to accumulate signal charges corresponding to incident amounts of the radioactive rays therein, and scanning lines for driving the pixels and the signal lines for reading out the signal charges from the pixels to output the radiographic image are provided in correspondence with lines and columns of the pixels respectively. The driving device outputs drive signals to the scanning lines to turn switching elements of the pixels ON and OFF to execute sequentially a pixel resetting operation, the charge accumulating operation, and a signal charge reading operation for reading out the accumulated signal charges from the pixels. The switching elements are turned ON in the pixel resetting operation to read out dark charges through the signal lines, the dark charges being generated in the pixels regardless of the radioactive rays. The switching element are turned OFF in the charge accumulating operation, and are turned ON in the signal charge reading operation to read out the signal charges through the signal lines.

Preferably, the control device controls the driving device to execute the pixel resetting operation periodically during the radiation detecting operation.

More preferably, the switching elements are simultaneously turned ON to reset all pixels at once in the pixel resetting operation during the radiation detecting operation.

An interval between the periodical pixel resetting operations during the radiation detecting operation, in which interval the switching elements are kept OFF, is preferably determined to be at most equal to or less than a predetermined maximum radiation time available for the radiation source to radiate the radioactive rays continuously.

The control device preferably controls the radiation detecting device to start the radiation detecting operation when a command to start preparation for imaging is entered.

Preferably, the control device starts counting an accumulation time predetermined for continuing the charge accumulating operation from a moment when the radiation detecting device detects the start of radiation of the radioactive rays, to switch to the reading operation when the predetermined accumulation time has elapsed.

The predetermined accumulation time is preferably a predetermined maximum radiation time available for the radiation source to radiate the radioactive rays continuously.

Preferably, at least one of the signal lines is connected to an integrating amplifier that accumulates the leaked charges to output a voltage according to the accumulated amount of leaked charges, and wherein the radiation detecting device compares the output voltage of the integrating amplifier with a reference voltage to detect the start of radiation when the output voltage of the integrating amplifier gets above the predetermined reference voltage.

More preferably, the integrating amplifier is connected to one signal line that is located in a center zone of the imaging area.

Preferably, the control device periodically resets the leaked charges as accumulated in the integrating amplifier during the radiation detecting operation.

The signal lines are each connected to an integrating amplifier for outputting a voltage according to the amount of signal charges read through the connected signal line during the reading operation, and at least one of the integrating amplifiers preferably doubles as the integrating amplifier outputting the voltage according the amount of leaked charges in the radiation detecting operation.

Preferably, the radiation detecting device further detects the end of radiation of the radioactive rays on the basis of the charge leaks.

According to the present invention, the start of radiation of the radioactive rays is detected on the basis of charge leaks from the pixels while the switching elements of the pixels are OFF, and while the switching elements are kept OFF, the charge accumulating operation for accumulating the signal charges in the pixels is started after the start of radiation is detected. Thus the radiographic image detector of the present invention can detect the start of radiation of the radioactive rays by itself without wasting the radioactive rays.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

First Embodiment

Figure 1:
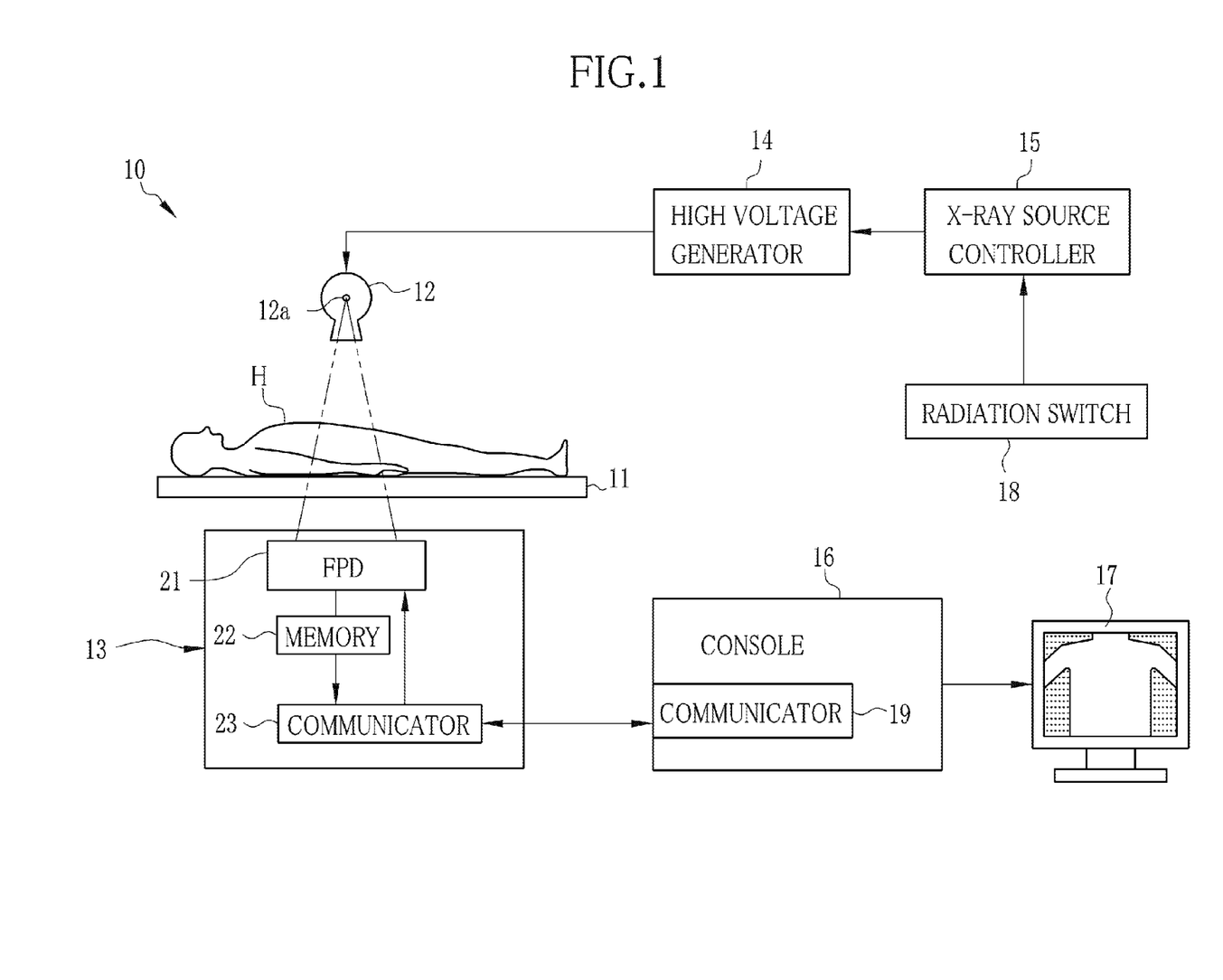
FIG. 1 is a schematic diagram illustrating an X-ray radiography system.

In FIG. 1, an X-ray radiography system 10 includes a radiological examination table having a table top 11 for laying a test subject H thereon, an X-ray source 12 for radiating X-rays from an X-ray focus 12a toward the subject H, and a radiographic image detector 13 for detecting an X-ray image of the test subject H from the X-rays that have penetrated through the test subject H. The radiographic image detector 13 may be formed as an electronic cassette 13 that is removably attached to the radiological examination table. The x-ray light source 12 consists of an X-ray tube and a collimator for limiting the radiation field of the X-rays from the X-ray tube.

The X-ray radiography system 10 also includes a high voltage generator 14, an X-ray source controller 15, a console 16, and a monitor 17. The x-ray source controller 15 is fed with various imaging conditions such as tube voltage, tube current and radiation time, which may be input through a not-shown operation panel or the like. The x-ray source controller 15 transfers the input imaging conditions to the high-voltage generator 14. Also a radiation switch 18 for inputting a radiation starting signal is connected to the x-ray source controller 15, so that the x-ray source controller 15 applies the input radiation starting signal from the radiation switch 18 to the x-ray light source 12 via the high-voltage generator 14.

The high-voltage generator 14 generates tube voltage and tube current according to the imaging conditions fed from the x-ray source controller 15, and supplies the x-ray light source 12 with the generated tube voltage and current. The x-ray light source 12 starts radiating the X-rays according to the supplied tube voltage and current when the x-ray light source 12 receives the radiation starting signal. Thereafter the x-ray light source 12 stops the radiation in a given radiation time.

The console 16 is a control device for controlling the electronic cassette 13. The radiation starting signal from the radiation switch 18 is not applied to the console 16. The console 16 sends a control signal to the electronic cassette 13 via a communicator 19, to receive data of the X-ray image detected by the electronic cassette 13. The monitor 17 may display the X-ray image received on the electronic cassette 13, and may also display operational screens for operating the console 16.

The electronic cassette 13 has a flat parallelepiped housing that contains a flat panel detector (FPD) 21 for detecting X-rays, a memory 22 for temporarily storing X-ray image data output from the FPD 21, and a communicator 23 for communicating the data in the memory 22 and the control signals with the console 16. The communicator 23 may for example be a wireless communicator that uses electric waves or an optical device such as infrared ray for wireless communication. The electronic cassette 13 may also include a not-shown battery for supplying power to the respective components of the electronic cassette 13, so that the electronic cassette 13 may operate wirelessly. Alternatively, the communicator 23 may be a wired one that uses a cable for communication, and the electronic cassette 13 may be supplied through a supply cable from a commercial power source instead of the battery.

Figure 2:
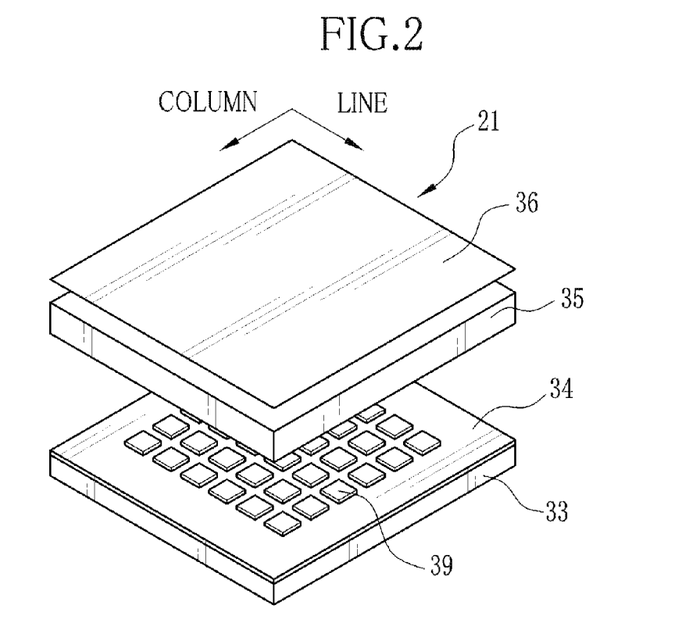
FIG. 2 is an exploded perspective view of a flat panel detector.

As shown in FIG. 2, the FPD 21 is a direct conversion type flat panel detector having an X-ray conversion layer 35 that convers the X-rays directly to electric signals. The FPD 21 has an imaging area in which pixels 39 are arranged in a matrix. Specifically, the FPD 21 has an active matrix substrate having a thin film transistor (TFT) array 34 formed on a glass substrate 33, and the x-ray conversion layer 35 and a common electrode 36 formed atop another on the TFT array 34. In the TFT array 34, thin film transistors 42 are provided one for one pixel 39, as shown in FIGS. 3 and 4, and each pixel 39 consists of a pixel electrode 40, a thin film transistor (TFT) 42 and a capacitor 41.

Figure 3:
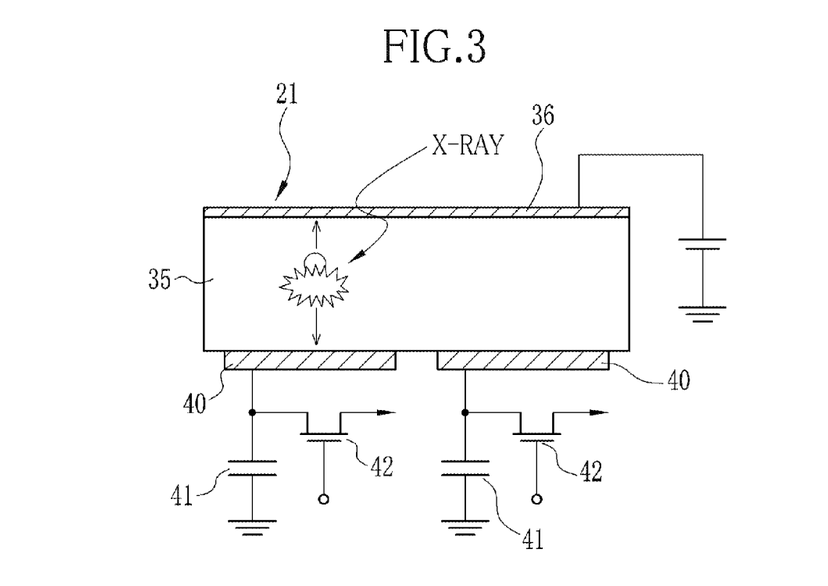
FIG. 3 is a schematic diagram illustrating the electric structure of the flat panel detector.
Figure 4:
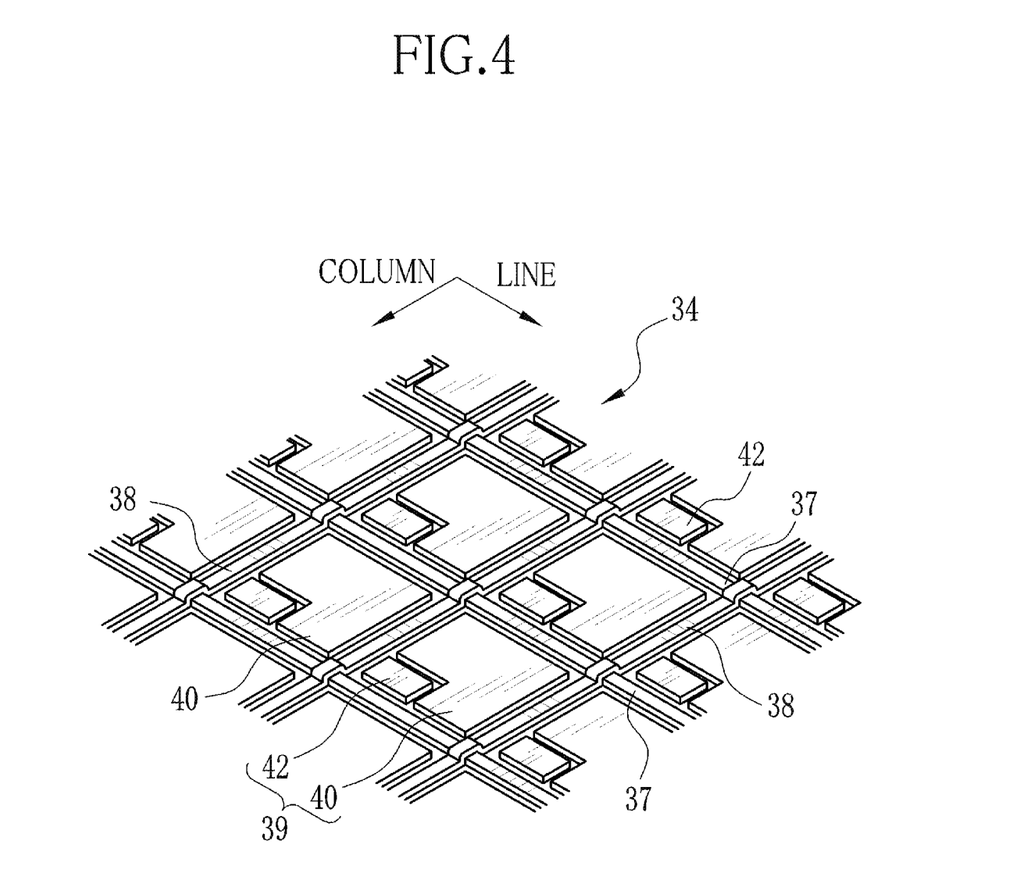
FIG. 4 is a perspective view of a thin film transistor array.

The x-ray conversion layer 35 may be made of a photoconductive film such as amorphous selenium, and generates charges (pairs of electrons and holes) when X-rays enters, as shown in FIGS. 3 and 4. When a DC bias voltage is applied to the common electrode 39, an electric field is induced between the common electrode 36 and the pixel electrodes 40 that are provided on the bottom surface of the x-ray conversion layer 35. Then the charges generated in the x-ray conversion layer 35 move to the common electrode 36 or the pixel electrodes 40 according to their polarities. The charges collected in the pixel electrodes 40 are accumulated as signal charges in the capacitors 41.

The x-ray conversion layer 35 generates not only the signal charges corresponding to the incident amounts of X-rays but also dark charges regardless of the X-ray incidence. Since the bias voltage is always applied while the FPD 21 is active, the dark charges generated in the x-ray conversion layer 35 are accumulated in the capacitors 41, like the signal charges.

The TFT array 34 is provided with scanning lines 37 and signal lines 38. One scanning line 37 corresponds to one line of the pixels 39, and is connected to gates of the TFTs 42 of the corresponding line. One signal line 38 corresponds to one column of the pixels 39, and is connected to sources of the TFTs 42 of the corresponding column. Each drain of the TFTs 42 is connected to the capacitor 41. The TFT 42 is a switching element that is turned ON to read out the signal charges from the capacitor 41 when a gate pulse is applied from the scanning line 37.

Figure 5:
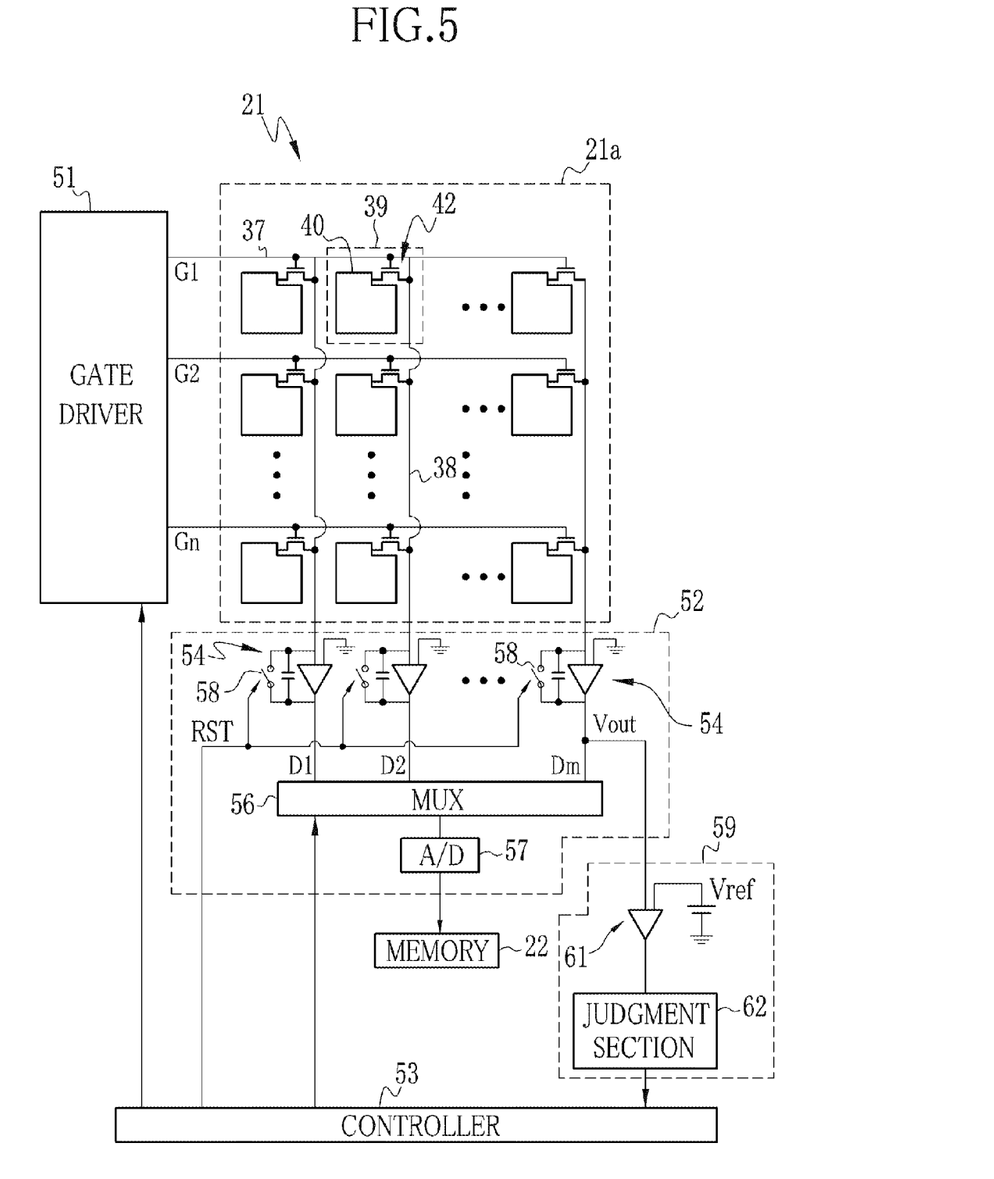
FIG. 5 is an explanatory diagram illustrating the electric structure of a radiographic image detector according to a first embodiment of the present invention.

As shown in FIG. 5, the FPD 21 includes an imaging panel 21a, a gate driver 51, a signal processing circuit 52, a controller 53, and a radiation detecting section 59. The imaging panel 21a defines the imaging area in which the pixels 39 are arranged in a matrix. The gate driver 51 drives the TFTs 42 of the pixels 39 to read out the charges. The signal processing circuit 52 converts the charges of the respective pixels 39 to digital data. The controller 53 controls the respective components of the FPD 21. The radiation detecting section 59 detects that the x-ray light source 12 starts radiating X-rays.

The pixels 39 are arranged two-dimensionally in n-lines and m-columns, n and m represent a natural number, for example at intervals of about 150 μm. The scanning lines 37 are connected to the gate driver 51, and the signal lines 38 are connected to the signal processing circuit 52.

The gate driver 51 is a driving device that outputs gate pulses G1 to Gn, drive pulses for the TFTs 42, to the respective scanning lines 37 to turn the TFTs 42 ON and OFF. When the TFT 42 is OFF, the channel connecting the capacitor 41 to the signal line 38 is shut off, so that the charges generated in the x-ray conversion layer 35 and collected in the pixel electrode 40 are accumulated in the capacitor 41. When the TFT 42 is turned ON, the channel from the capacitor 41 to the signal line 38 is open, so that the charges accumulated in the capacitor 41 is output to the signal line 38.

The signal processing circuit 52 includes integrating amplifiers 54, a multiplexer (MUX) 56, and an A/D converter 57. The integrating amplifiers 54 are connected to the signal lines 38 in one-to-one relationship. The integrating amplifier 54 consists of an operational amplifier and a capacitor connected between an input and an output of the operational amplifier. The signal line 38 is connected to the input of the operational amplifier. The other input of the operational amplifier is grounded. The integrating amplifiers 54 integrate the signal charges from the signal lines 38, to convert the signal charges to voltage signals D1 to Dm. Outputs of all integrating amplifiers 54 are connected in parallel to each other to the MUX 56. An output of the multiplexer 56 is connected to the A/D converter 57.

The multiplexer 56 sequentially selects one integrating amplifier 54 after another from among these integrating amplifiers 54, to output the voltage signals D1 to Dm from the integrating amplifiers 54 in serial to the A/D converter 57. The A/D converter 57 converts the input voltage signals D1 to Dm to digital data and outputs it to the memory 22.

In addition, a reset switch 58 is connected to each integrating amplifier 54. The reset switch 58 is turned ON by a reset pulse or reset signal RST that is output from the controller 53, to reset the charges integrated in the integrating amplifier 54.

While the x-ray light source 12 is radiating X-rays and the X-rays are coming in the x-ray conversion layer 35, the x-ray conversion layer 35 generates signal charges corresponding to the incident amounts of the X-rays. The controller 53 controls the gate driver 51 and the signal processing circuit 52 to execute a charge accumulating operation for accumulating the signal charges in the pixels 39 and a reading operation for reading out the signal charges from the pixels 39.

The charge accumulating operation is executed in synchronism with x-ray radiation intervals such that the TFTs 42 of all pixels 39 are turned OFF during the charge accumulating operation. As a result, signal charges are accumulated in every pixel 39 according to the x-ray incident amounts. The controller 53 starts counting the time of accumulation from the start of the charge accumulating operation, to turn the TFTs 42 ON when a predetermined accumulation time has elapsed, thereby stopping the charge accumulating operation and proceeding to the reading operation.

In the reading operation, the gate driver 51 outputs the gate pulses G1 to Gn sequentially to the scanning lines 37, to activate the scanning lines 37 one after another, so that the TFTs 42 of one line connected to the presently active scanning line 37 are turned ON. Thus, while the TFTs 42 are turned ON line by line, the accumulated signal charges are read out from the pixels 39 line by line, and are fed through the signal lines 38 into the signal processing circuit 52.

For instance, when the gate pulse G1 is applied to the first scanning line 37, the TFTs 42 of the pixels 39 of the first line are turned on, so that the signal charges are read out from the pixels 39 of the first line into the respective signal lines 38. In the signal processing circuit 52, the integrating amplifiers 54 output voltage signals D1 to Dm corresponding to the signal charges input from the respective signal lines 38, and the voltage signals D1 to Dm corresponding to the first line of the pixels 39 are converted to digital image data. The digital image data of the first line is stored in the memory 22.

Before the signal charges being read from the pixels 39 of the second line, the reset pulse RST is applied to the integrating amplifiers 54 to reset the integrating amplifiers 54. Thereafter the gate pulse G2 is applied to the second scanning line 37 to read out the signal charges from the pixels 39 of the second line through the signal lines 38 into the signal processing circuit 52. The signal processing circuit 52 converts the signal charges of the second line to digital image data and outputs the image data to the memory 22, in the same way as for the first line. Thus the image data of the second line is stored in the memory 22. In the reading operation, the same procedure as above is repeated to read out the signal charges of the last line, n-th line.

In addition to the charge accumulating operation and the reading operation, the FPD 21 executes a pixel resetting operation before starting the charge accumulating operation. As described above, the x-ray conversion layer 35 generates dark charges regardless of the x-rays, beside the signal charges corresponding to the x-ray incident amount. The dark charges turn out to be a noise for x-ray image that should be produced based on the signal charges. The pixel resetting operation is for resetting the pixels 39 by reading out the dark charges accumulated in the pixels 39 through the signal lines 38.

The pixel resetting operation is executed for example by resetting the pixels 39 sequentially line by line. According to this line-sequential resetting method, the gate driver 51 outputs the gate pulses G1 to Gn sequentially to the respective scanning lines 37, like in the reading operation, to activate the scanning lines 37 one after another, to turn on those TFTs 42 connected to the activated scanning line 37. As the TFTs 42 are turned ON, the dark charges accumulated in the pixels 39 are discharged through the signal lines 38 to the signal processing circuit 52. Thus the pixels 39 are reset line by line.

Like the signal charges, the dark charges are accumulated in the capacitors of the integrating amplifier 54, but the reset pulse RST is applied to reset the dark charges accumulated in the integrating amplifiers 54 without the MUX 56 reading the voltage signals from the integrating amplifiers 54. Thus the dark charges of the pixels 39 are reset line by line to reset the dark charges of all pixels 39 of one frame.

The gate driver 51 determines from leaked charges whether the x-ray light source 12 starts radiating x-rays, because the charge slightly leaks from the pixel 39 to the signal line 38 while the TFT 42 is OFF. Ideally the charges accumulated in the capacitor 41 will not flow to the signal line 38 while the TFT 42 is OFF to shut off the channel between the capacitor 41 and the signal line 38. In practice, however, a little part of the accumulated charges will leak to the signal line 38 even while the TFT 42 is OFF. The amount of leaked charge increases with the amount of accumulated charge in the pixel 39, though the leak charge amount is normally so little as compared to the signal charge that it will not adversely affect the FPD 21, not causing malfunction of the FPD 21 nor giving unignorable noises to the detected x-ray image.

Without incidence of x-ray in the x-ray conversion layer 35, the pixels 39 accumulate the dark charges alone. On the other hand, while the x-ray source 12 is radiating x-rays and the x-rays are entering the x-ray conversion layer 35, the pixels 39 accumulate the signal charges. More precisely, since the dark charges are also generated while the x-rays are entering the x-ray conversion layer 35, the signal charges include the dark charges. Of course the amount of the signal charge is remarkably greater than that of the dark charge. Therefore, the amount of charge leak to the signal line 38 is also remarkably greater while the pixel 39 accumulate the signal charge than while the pixel 39 accumulates the dark charge alone. Therefore, the radiation detecting section 59 can detects the start of x-ray radiation by monitoring changes in the charge leak amount before and after the start of x-ray radiation.

The radiation detecting section 59 consists of a comparator 61 and a judgment section 62. The comparator 61 has two input terminals; one is fed with the output voltage Vout of the integrating amplifier 54, and the other is fed with a reference voltage Vref. The comparator 61 compares the output voltage Vout of the integrating amplifier 54 and the reference voltage Vref, to output a first voltage when the output voltage Vout is below the reference voltage Vref, or output a second voltage when the output voltage Vout goes above the reference voltage Vref.

The judgment section 62 monitors the output of the comparator 61 to judge that the x-ray source 12 starts x-ray radiation when the output of the comparator 61 changes from the first voltage to the second voltage. Detecting the start of x-ray radiation, the judgment section 62 outputs a start-of-radiation detecting signal to the controller 53, noticing of the start of x-ray radiation. The radiation detecting section 59 starts the radiation detecting operation in response to a start command from the controller 53, and the controller 53 outputs a stop command to the radiation detecting section 59 to stop the radiation detecting operation upon receipt of the start-of-radiation detecting signal.

In an embodiment, the radiation detecting section 59 is connected to the output of only one of the integrating amplifiers 54, to detect the output voltage Vout that corresponds to the leak charges on one of the signal lines 38 provided in the imaging area of the FPD 21. In the example of FIG. 5, the radiation detecting section 59 is connected to the last integrating amplifier 54 that is connected to the last ($m^{-th}$) signal line 38 among the signal lines 38 provided in the imaging area. However, this is for the sake of avoiding complicating the drawing, and the radiation detecting section 59 may be connected to any one of the integrating amplifiers 54. Preferably, the radiation detecting section 59 may be connected to such a signal line 38 that is provided in a center zone of the imaging area. This is because the range irradiated with the x-ray can be set smaller than the imaging area of the FPD 21 depending on the site to be captured for examination. Even in that case, the signal line 38 disposed in the center zone of the imaging area will be included in the x-ray radiation range, so that the leak charges detected through the middle signal line 38 will certainly reflect the incident amount of x-rays in spite of the size variation of the x-ray radiation range. Thus the radiation detecting section 59 can reliably detect the start of x-ray radiation with reference to the leak charge.

Since one of those integrating amplifiers 54 constituting the signal processing circuit 52 is connected to the comparator 61, it is unnecessary to provide a specific integrating amplifier for the radiation detecting section 59 separately from the signal processing circuit 52.

Prior to the imaging using the x-ray source 12 and the electronic cassette 13, various imaging conditions are set up in the x-ray source controller 15 and the electronic cassette 13, respectively. The imaging conditions include tube voltage, tube current and radiation time. The tube voltage defines the energy spectrum of the x-rays radiated from the x-ray source 12. The tube current defines the irradiance of the x-rays per unit time. The radiation time is the length of time for radiating the x-rays. The imaging conditions vary depending on the site to take the x-ray image, the age of the test subject H, and other factors.

To the electronic cassette 13, the imaging conditions are input through the console 16. According to the input imaging conditions the electronic cassette 13 sets up the gain of the integrating amplifiers 54 and other parameters. The console 16 is previously provided with imaging menus for different sets of imaging conditions, and these imaging menus are displayed as selectable on an operation screen. When one imaging menu is selected on the operation screen, the corresponding imaging conditions are set up in the electronic cassette 13. When the imaging conditions are input through the console 16, the controller 53 of the electronic cassette 13 receives the input data as a start preparation-for-imaging command. Upon the start preparation-for-imaging command, the controller 53 actuates the radiation detecting section 59 to start the radiation detecting operation.

Figure 6:
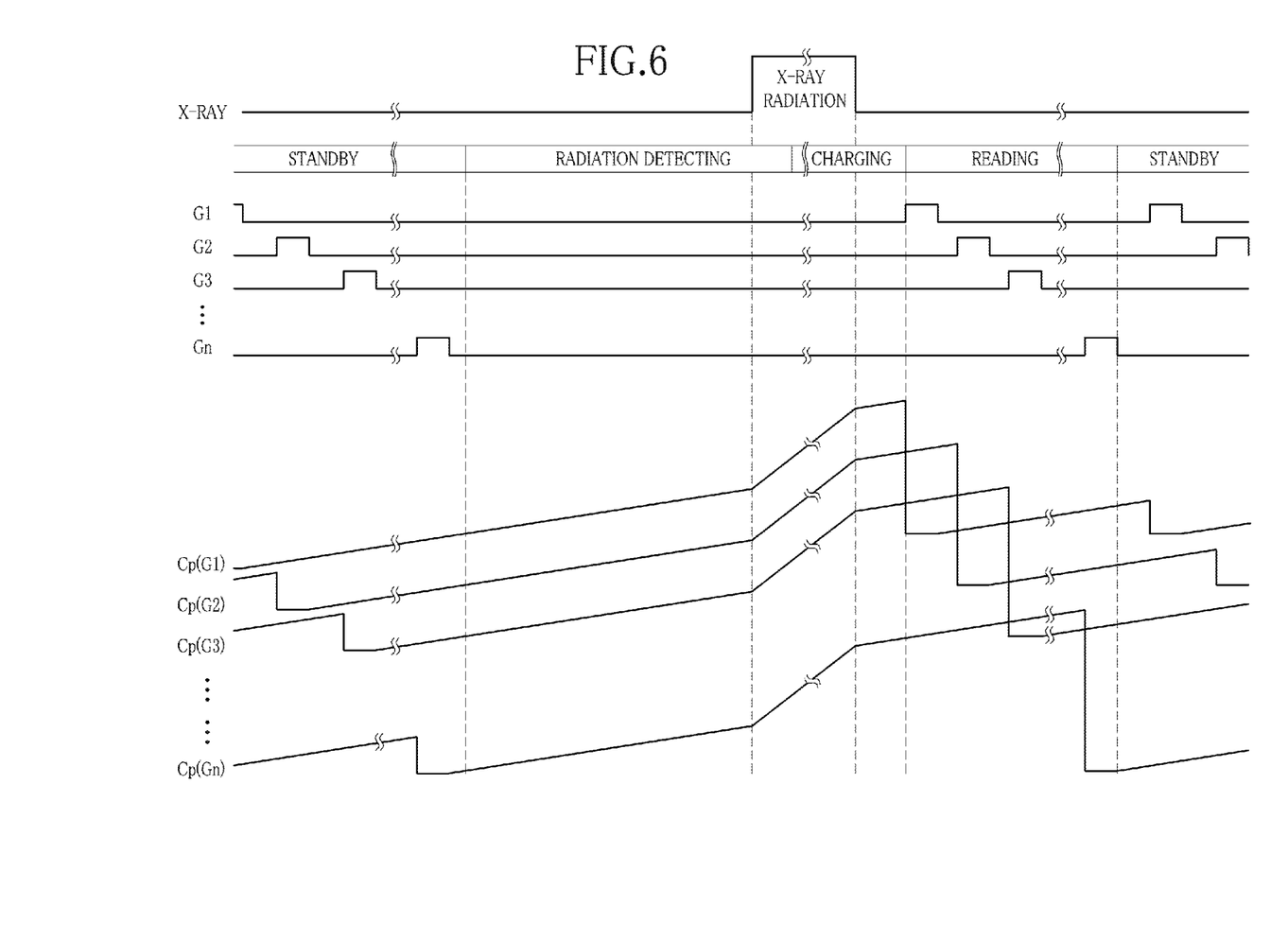
FIG. 6 shows timing charts illustrating the operation of the radiographic image detector of the first embodiment.
Figure 7:
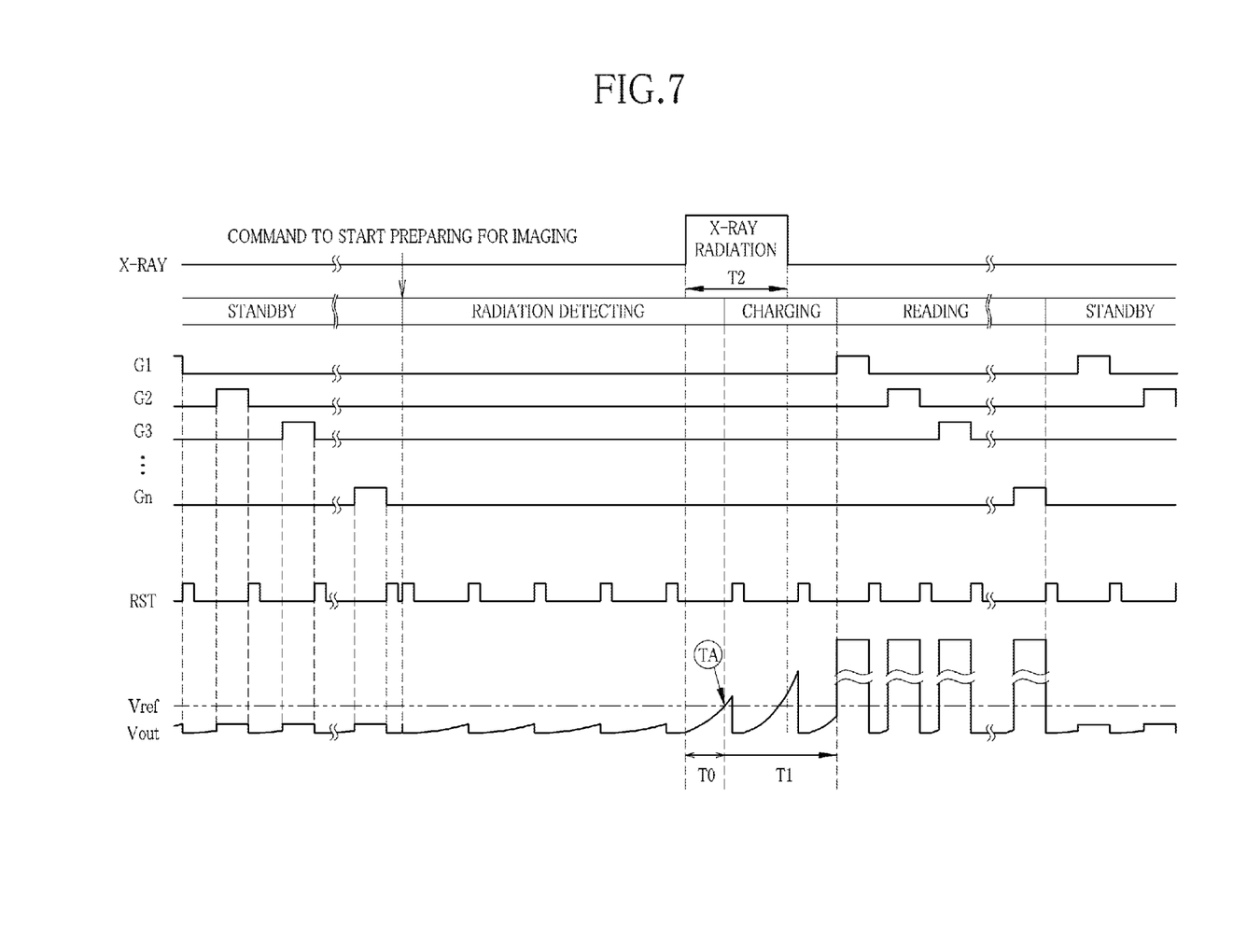
FIG. 7 shows timing charts illustrating reset pulses and output voltage of an integrating amplifier of the radiographic image detector of the first embodiment.

Referring to FIGS. 6 and 7, the operation of the FPD 21 is illustrated in timing charts. First when the electronic cassette 13 is activated, the FPD 21 gets to a standby mode waiting for the start preparation-for-imaging command. In the standby mode, the gate driver 51, the signal processing circuit 52, and the radiation detecting section 59 are ready for operation in response to the command from the controller 53. In the standby mode, the bias voltage is applied to the common electrode 36, and the pixel resetting operation is repeatedly executed according to the line-sequential resetting method.

The gate driver 51 sequentially outputs the gate pulses G1 to Gn to the first to last ($n^{-th}$) scanning lines 37, to turn on the TFTs 42 of the pixels 39 line by line. In FIG. 6, the accumulated charges Cp of the pixels 39 increase with the dark charges, but the gate pulses G1 to Gn applied to turn on the respective TFTs 42 reset the accumulated charges Cp. Moreover, upon the gate pulses G1 to Gn, the dark charges are transferred from the pixels 39 to the integrating amplifiers 54. However, the integrating amplifiers 54 are reset by the reset pulses RST that are applied to the integrating amplifiers 54 synchronously with the gate pulses G1 to Gn.

The radiation detecting operation does not start in standby mode. Therefore, even if the voltage Vout output from the integrating amplifier 54 to the radiation detecting section 59 goes up beyond the reference voltage Vref, the radiation detecting section 59 will not detect it as the start of radiation.

When one imaging menu is selected on the console 16, imaging conditions of the selected menu are input in the electronic cassette 13. The controller 53 receives the input of the imaging conditions as the start preparation-for-imaging command, upon which the controller 53 actuates the radiation detecting section 59 to start the radiation detecting operation.

In the radiation detecting operation, the pixel resetting operation is interrupted, and the TFTs 42 of all pixels 39 are turned OFF. As shown in FIG. 6, when the TFTs 42 are turned OFF, charges Cp accumulated in the pixels 39 begin to increase because of the dark charge. During the radiation detecting operation, the TFTs 42 is kept OFF, so that the accumulated charges Cp continuously increase.

Parts of accumulated charges Cp accumulated in the pixels 39 leak to the signal lines 38 of the corresponding columns. As a result, as shown in FIG. 7, the output voltages Vout of the integrating amplifiers 54 increase. In the radiation detecting operation, however, the reset pulses RST are periodically input to reset the leak charges accumulated in the integrating amplifiers 54. In order to prevent the radiation detecting section 59 from making false detection from the output voltage Vout that corresponds to the leak charges due to the dark charges, the reference voltage Vref of the radiation detecting section 59 is set higher than a level that the output voltage Vout can reach within the input interval of the reset pulses RST. In other words, the input intervals of the reset pulses RST is determined such that the output voltage Vout will not go above the reference voltage Vref in the radiation detecting operation.

As shown in FIG. 6, when the x-ray source 12 starts x-ray radiation, the radiated x-rays enter the x-ray conversion layer 35, and signal charges are accumulated in the pixels 39. As a result, the accumulated charges Cp increase and hence the leak charges increase. Because the signal charges are remarkably greater than the dark charges, the accumulated charges Cp surge after the start of x-ray radiation. Correspondingly the amount of charge leak surge, and hence the output voltages Vout of the integrating amplifiers 54 go above the reference voltage Vref, as shown in FIG. 7. Accordingly the output of the comparator 61 changes to the second voltage level, so that the judgment section 62 judges that the x-ray source 12 starts radiation, sending the start-of-radiation detecting signal to the controller 53.

Upon receipt of the start-of-radiation detecting signal from the radiation detecting section 59, the controller 53 stops the radiation detecting operation, and starts the charge accumulating operation. Since the TFTs 42 are kept OFF in the radiation detecting operation, the charge accumulating operation may be started without switching the condition of the TFTs 42. The controller 53 begins to count an accumulation time T1 from the start of the charge accumulating operation, i.e. from the moment when it receives the start-of-radiation detecting signal.

The accumulation time T1 is set longer than the x-ray radiation time, so that the charge accumulating operation will not be terminated before the x-ray radiation stops. Specifically, because the x-ray radiation time of the x-ray source 12 includes a maximum radiation time as an upper limit available for the imaging conditions, the accumulation time T1 is set longer than the maximum radiation time. More exactly, because there is a slight time lag T0 from when the x-ray source 12 starts x-ray radiation to when the radiation detecting section 52 detects the start of x-ray radiation (the start-of-radiation detection time TA), the accumulation time T1 is determined considering the time lag T0 in addition to the maximum radiation time.

In the present invention, the radiation detecting operation is carried out while the TFTs 42 are kept OFF, and therefore the switching condition of the TFTs 42 is unchanged from the start of the radiation detecting operation to the end of the charge accumulating operation. A main difference between the radiation detecting operation and the charge accumulating operation is that the accumulation time T1 is counted or not.

Also during the charge accumulating operation, the reset pulses RST are periodically applied. Therefore, the output voltage Vout will once go above the reference voltage Vref and is then reset to zero by the reset pulse RST. Thereafter, the output voltage Vout again reaches the reference voltage Vref. However, once the output voltage Vout reaches the reference voltage Vref, the radiation detecting operation is stopped, so that the out voltage Vout will not be monitored, and hence the controller 53 will not detect the start of x-ray radiation again.

When the accumulation time T1 has elapsed, the controller 53 moves to the reading operation. In the reading operation, the gate pulses G1 to Gn are sequentially applied to read out the signal charges from the pixels 39 line by line, and data of a frame of x-ray image is written in the memory 22. When the reading operation is accomplished, the electronic cassette 13 returns to the standby mode, starting the pixel resetting operation again.

As described so far, the electronic cassette 13 of the present invention detects the start of x-ray radiation on the basis of the charge leaks from the pixels 39. Thus, the electronic cassette 13 can detect the start of x-ray radiation by itself without the need for communicating any synchronizing signal with the x-ray generating device consisting of the x-ray source 12 and the x-ray source controller 15.

Because the radiation is detected making use of the charge leaks in the signal lines 38 while the TFTs 42 of the pixels 39 are OFF, the charge accumulating operation may start after the detection of the start of radiation without changing the OFF condition of the TFTs 42. Therefore, the signal charges will be accumulated correspondingly to the actual x-ray incident amounts in the entire radiation time T2 including the time lag T0. It means that the signal charges exactly represent the actual x-ray incident amounts. In other words, the test subject H may not uselessly be exposed to the x-rays over a requisite time for capturing the x-ray image.

In the above first embodiment, the TFTs 42 of all pixels 39 are turned OFF as the electronic cassette 13 switches from the standby operation to the radiation detecting operation, and thereafter the TFTs 42 are kept OFF. It is preferable to reset all pixels 39 once after the transit from the standby operation to the radiation detecting operation, e.g. simultaneously with the transit to the radiation detecting operation. Thus, extraneous dark charges may be withdrawn from those pixels 39 which have not been reset by the line-sequential resetting in the standby operation because of interruption of the line-sequential resetting, or those pixels 39 which have been reset before but thereafter accumulated dark charges again. Resetting the pixels 39 will reduce noises on the x-ray image. The pixels 39 may preferably be reset simultaneously with the transition to the radiation detecting operation by applying the gate pulses G1 to Gn simultaneously to all signal lines 38. This simultaneous resetting is preferable because all pixels 39 may be reset instantly and the x-ray radiation may be started immediately after the transition to the radiation detecting operation without the risk of starting the x-ray radiation before completing resetting all pixels. Thus the simultaneous resetting has little affection on the radiation detecting operation.

The above-described first embodiment illustrates an example where the TFTs 42 are kept OFF during the radiation detecting operation, so that the pixels 39 can always accumulate the signal charges. This configuration will not provide any problem if the x-ray radiation starts immediately after the imaging condition are set up at the console 16. However, if it takes a certain time from the set-up input of the imaging condition to the start of x-ray radiation, the dark charges accumulated in the pixels 39 will correspondingly increase with time. Because the dark charges are nothing but noises for the signal charges, the noises caused by the dark charges in the x-ray image data will increase as the radiation detecting operation gets longer.

Second Embodiment

Meanwhile the console 16 processes the detected x-ray image data to eliminate such noises that result from the dark charges. Specifically, image data detected while no x-ray is radiated, hereinafter referred to as off-set image data, are previously memorized and subtracted from the detected x-ray image data, to eliminate the noises. The off-set image data may for example be such image data that represent the noises resulted from dark charges accumulated with the signal charges in the maximum radiation time. Accordingly, those dark charges accumulated from the start-of-radiation detecting operation to the start of x-ray radiation will not be reflected on the off-set image data. As a result, if the time from the start-of-radiation detecting operation to the start of x-ray radiation is too long, the noises caused by the dark charges cannot completely be eliminated using the off-set image data. To solve this problem, it is preferable to reset the pixels 39 to cancel the dark charges periodically during the radiation detecting operation as well.

Figure 8:
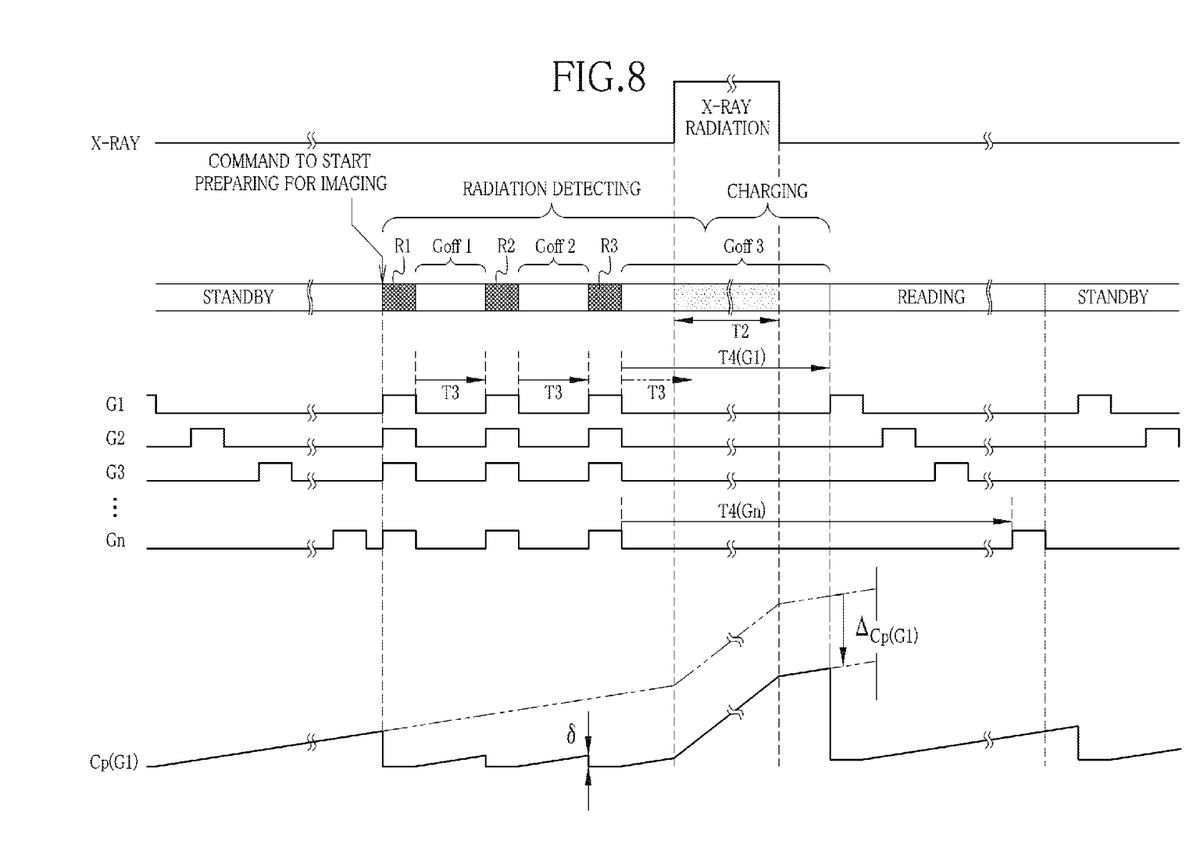
FIG. 8 shows timing charts illustrating the operation of a radiographic image detector according to a second embodiment.
Figure 9:
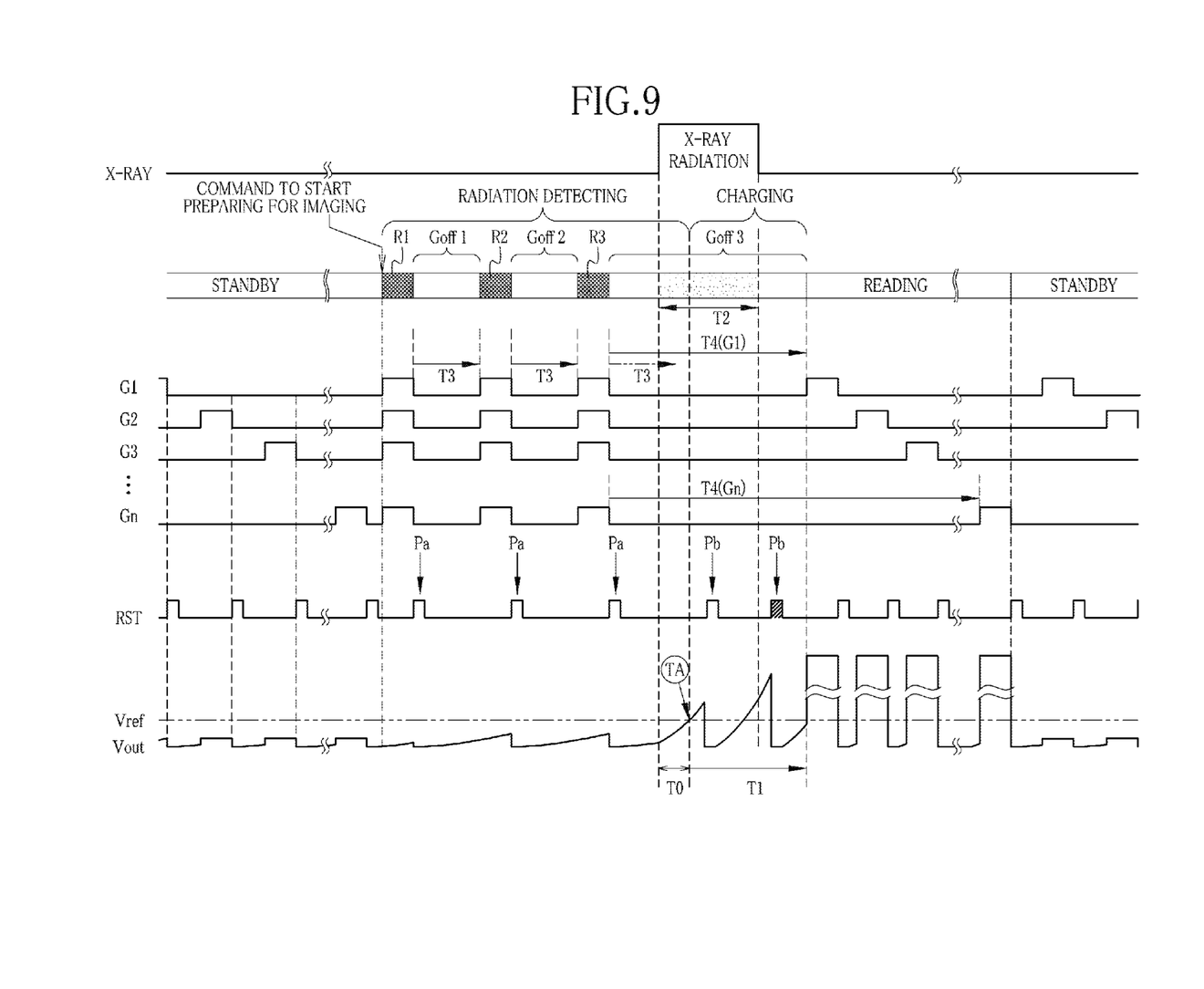
FIG. 9 shows timing charts illustrating reset pulses and output voltage of an integrating amplifier of the radiographic image detector of the second embodiment.

As shown in FIGS. 8 and 9, simultaneously with the transition from the standby operation to the radiation detecting operation of the electronic cassette 13, the controller 53 applies the gate pulses G1 to Gn to all signal lines 38 at once, thereby to turn the TFTs 42 of all pixels 39 ON, resetting all pixels 39 at once (simultaneous resetting R1). As a result, dark charges accumulated in the pixels 39 during the standby operation are simultaneously read to the signal lines 38, resetting all pixels 39. Thereafter, the controller 53 makes the simultaneous resetting R1, R2 . . . of all pixels 39 repeatedly at constant time intervals. In the present example, the intervals Goff1, Goff2 . . . between the simultaneous resetting of all pixels 39, are set at a predetermined time T3, and the TFTs 42 are kept OFF and capable of accumulating charges during these intervals.

In a case where the pixels 39 are not reset during the radiation detecting operation, the dark charges accumulated in the pixels 39 increase with time as shown by phantom lines in FIG. 8. On the other hand, with the simultaneous resetting R1, R2, R3 . . . , dark charges accumulated in the respective pixels 39 are suppressed to such charge amounts 6 that will be accumulated in the predetermined time T3 even during the radiation detecting operation.

When the radiation switch 18 is pressed to start x-ray radiation from the x-ray source 12, the radiation detecting section 59 detects the start of x-ray radiation in the same way as in the first embodiment, and applies the start-of-radiation detecting signal to the controller 53. The controller 53 receives the start-of-radiation detecting signal as a command to start preparation-for-imaging, and starts counting the maximum radiation time T1 from the time TA when the start of x-ray radiation is detected. The controller 53 also stops the simultaneous resetting from the start-of-radiation detection time TA. For example, in a case where the x-ray radiation is started during the interval Goff3 after the simultaneous resetting R3 of all pixels 39, the controller 53 does not make the next resetting R4 of the pixels 39 even when the predetermined time T3 has elapsed after the resetting R3, and the following resetting operations are all canceled. Thus, the interval Goff3, during which the TFTs 42 are kept OFF and the start of x-ray radiation is detected at the start-of-radiation detection time TA, is extended to the end of the charge accumulating operation.

Because the actual x-ray radiation time T2 is included in the interval Goff3, the amount of dark charges accumulated with the signal charges in the pixels 39 may be generally determined by the length of the interval Goff3. For example, charge amounts Cp (G1) of those pixels 39 which the first gate pulse (G1) is applied to will represent not only signal charges accumulated during the x-ray radiation time T2 but also dark charges that will be unnecessarily accumulated during the interval Goff3, including dark charges accumulated from the resetting R3 to the actual start of x-ray radiation, dark charges accumulated during the x-ray radiation time T2, and dark charges accumulated from the end of x-ray radiation to the end of the charge accumulating operation, i.e. the start of the reading operation.

However, as shown in FIG. 8, the dark charges overlaid on the signal charges will be reduced by $\Delta Cp(G1)$ in comparison with a case where the resetting operations R1, R2, R3 are not executed in the radiation detecting operation, as indicated by the phantom lines. In addition, because the noises resulted from the dark charges accumulated during the x-ray radiation time T2 is substantially eliminated by the subtraction of the off-set image data from the detected image data in the console 16, the noises overlaid on the x-ray image displayed on the monitor 17 are reduced to such amounts that represent the dark charges accumulated from the resetting R3 to the actual start of x-ray radiation and the dark charges accumulated from the end of x-ray radiation to the start of the reading operation.

With respect to those pixels 39 which the $n^{-th}$ gate pulse Gn is applied to, the interval T4(Gn) from the resetting R3 to the input of the gate pulse Gn for starting the reading operation of these pixels 39 is longer than the interval T4(G1) from the resetting R3 to the input of the first gate pulse G1. As a result, even during the reading operation, dark charges will be further accumulated in those pixels 39 which the gate pulse Gn is applied to. However, because the off-set image data is also read out under the same condition, the off-set image data reflect the noises resulted from the dark charges accumulated during the reading interval, so that these noises will also be substantially eliminated from the x-ray image data by subtracting the off-set image data from the x-ray image data. Accordingly, as for those pixels 39 which the $n^{-th}$ gate pulse Gn is applied to, the noises overlaid on the displayed x-ray image are also reduced to such amounts that represent the dark charges accumulated from the resetting R3 to the actual start of x-ray radiation and the dark charges accumulated from the end of x-ray radiation to the start of the reading operation.

As shown in FIG. 9, after the cassette 13 moves to the radiation detecting operation, the reset pulses RST are applied to the integrating amplifiers 54, as indicated by arrows Pa, in synchronism with the simultaneous resetting R1, R2, R3 . . . of all pixels 39, i.e. immediately after the gate pulses G1 to Gn are applied simultaneously to all pixels 39. Thus, during the radiation detecting operation, that is, until the start of x-ray radiation is detected at the time TA, the integrating amplifiers 54 are periodically reset to withdraw the dark charges accumulated within the predetermined time T3 in the pixels 39.

On the other hand, during the charge accumulating operation from the start-of-radiation detection time TA till the cassette 13 moves to the reading operation, the gate pulses G1 to Gn are not applied to the pixels 39. Therefore, after the radiation detecting section 59 detects the start of x-ray radiation, the controller 53 starts applying the reset pulses RST to the integrating amplifiers 54 at constant intervals regardless of the gate pulses G1 to Gn, as indicated by arrows Pb. Thereby, even after the start of x-ray radiation is detected, the integrating amplifiers 54 are reset periodically.

According to the above-described second embodiment, the pixels 39 are reset at predetermined intervals during the radiation detecting operation, so that dark charges accumulated during the radiation detecting operation will be suppressed to lower levels than the constant value δ. Therefore, subtracting the off-set image data from the x-ray image data captured by the electronic cassette 13, the noises resulted from the dark charges may be efficiently eliminated from the x-ray image data.

Since all pixels 39 are reset simultaneously during the radiation detecting operation, unlike the line-sequential resetting in the standby operation, the pixels 39 are reset all at once in a moment. Therefore, in spite of the resetting operations of the pixels 39, the TFTs 42 are OFF almost all the time during the radiation detecting operation, and the signal charges may be accumulated in the intervals Goff1, Goff2.

As described above, the intervals Goff1 and Goff2, in which TFTs 42 are OFF, are set to have the predetermined time length T3 before the start of x-ray radiation. The time length T3 is preferably not more than the maximum radiation time T1. Because the off-set image data is based on dark charges accumulated in the maximum radiation time, if the predetermined time T3 is set longer than the maximum radiation time T1, the amount of dark charges will increase so much that the noises resulted from the dark charges cannot sufficiently be eliminated from the x-ray image by subtracting the off-set image data from the x-ray image data.

Moreover, if the start of x-ray radiation is detected during the simultaneous resetting of all pixels 39, the interval Goff3, including the actual x-ray radiation time T2, may be elongated up to twice the predetermined time T3. Accordingly, for the sake of reducing the noises caused by the dark charges, the time T3 should preferably be set as short as possible, and at least not more than the maximum radiation time. If the predetermined time T3 is longer than the maximum radiation time T1, the amount of dark charges accumulated in the interval Goff3 will always get above the amount of dark charges accumulated in the length of the maximum radiation time T1, so that the noises will increase as the predetermined time T3 is set longer than the maximum radiation time.

However, the shorter time T3 will increase the number of times of simultaneous resetting of all pixels 39. Then the probability of detecting the start of x-ray radiation during the resetting operation of the pixels 39, i.e. while the gate pulses G1 to Gn are applied to the pixels 39, will increase. If the start of x-ray radiation overlaps the resetting operation of the pixels 39, signal charges generated during the resetting operation will be withdrawn from the pixels 39. For this reason, the predetermined time T3 should preferably be set longer than half the maximum radiation time T1. Then, the noises due to dark charges will be efficiently suppressed without increasing the probability that the start of x-ray radiation may overlap with the resetting of the pixels 39.

In the above embodiment, the off-set image data is prepared on the basis of dark charges accumulated in the maximum radiation time. However, the off-set image may be prepared in other ways. That is, the time for measuring the noises caused by the dark charges may be determined appropriately. For example, the off-set image data may be prepared based on dark charges accumulated in a frequently used x-ray radiation time.

In the second embodiment, simultaneous resetting of all pixels 39 is executed immediately after the cassette 13 moves from the standby operation to the radiation detecting operation. The timing of executing the simultaneous resetting of all pixels 39 during the radiation detecting operation is not limited to this embodiment but may be modified appropriately. However, it is preferable to execute the simultaneous resetting of all pixels 39 at the start of the radiation detecting operation. Resetting all pixels 39 at the start of the radiation detecting operation, the pixels 39 will accumulate charges after discharging the dark charges accumulated before the radiation detecting operation. Therefore, even if the x-ray radiation starts immediately after the imaging conditions are input in the console 16, the pixels 39 can accumulate signal charges getting little noises from the dark charges accumulated before the radiation detecting operation.

In the above embodiment, the integrating amplifiers 54 are reset periodically after the start of x-ray radiation, as indicated by the arrows Pb of FIG. 9. After the start of x-ray radiation, however, the integrating amplifiers 54 may not necessarily be reset. Resetting the integrating amplifiers 54 after the start of x-ray radiation is to reset leak charges accumulated in the integrating amplifiers 54. These leak charges are leaked from those pixels 39 which are connected to the same signal line 38. If the leak charges are overlaid on those signal charges which are first read out from the first line of pixels 39, i.e. ones applied with the first gate pulse G1, in the reading operation, the overlaid leak charges cause the noises in the x-ray image. Therefore, it is preferable to reset the integrating amplifiers 54 even after the start of x-ray radiation.

In the second embodiment, the integrating amplifiers 54 are reset periodically after the start of x-ray radiation is detected. The interval or frequency of resetting the integrating amplifiers after the start of x-ray radiation may be determined appropriately. However, it is preferable to reset the integrating amplifiers 54 at least once immediately before proceeding to the reading operation. Thus, the leak charges have been discharged from the integrating amplifiers 54 at the start of the reading operation, reducing the noises caused by the leak charges overlaid on the signal charges.

Third Embodiment

In the above first and second embodiments, the radiation detecting section 59 detects the start of x-ray radiation. In the following third embodiment, the end of x-ray radiation may be detected.

Figure 10:
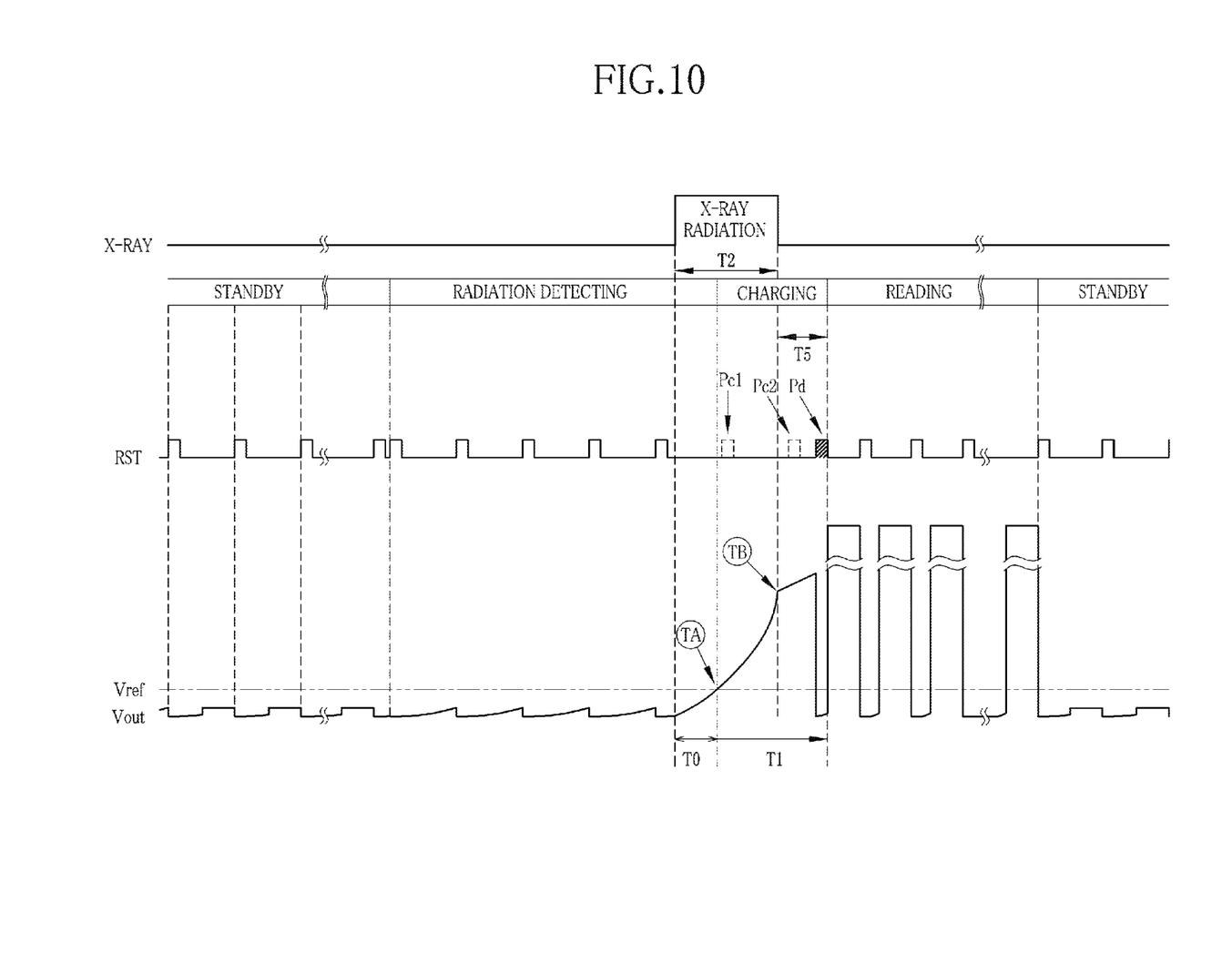
FIG. 10 shows timing charts illustrating reset pulses and output voltage of an integrating amplifier according to a third embodiment.

As shown in FIG. 10, in order to detect the end of x-ray radiation, the controller 53 inputs the reset pulses RST at constant intervals after the cassette 13 proceeds from the standby operation to the radiation detecting operation, like in the first or second embodiment, to reset the integrating amplifiers 54. When the radiation detecting section 59 detects the start of x-ray radiation (the time TA), the controller 53 however stops inputting the reset pulse RST, as indicated by arrows Pc1 and Pc2, so as not to withdraw the leak charges from the integrating amplifiers 54.

Since the reset pulse RST is not applied after the start of x-ray radiation is detected (the time TA), the output voltages Vout of the integrating amplifiers 54 continue to increase mainly because of the leak charges from the signal charges accumulated in the pixels 39. Thereafter when the x-ray radiation is terminated, the signal charges stop increasing, and hence the increase in the leak charges accumulated in the integrating amplifiers 54 gets less. As the result, the rate of change in the output voltage Vout of the integrating amplifier 54 will differ after the x-ray radiation from the rate of change during the x-ray radiation.

In this third embodiment, a comparator circuit including an operational amplifier is provided instead of the comparator 61 in a radiation detecting section 59. The comparator circuit outputs a first voltage or a second voltage depending upon the relative magnitude of the output voltage Vout of the integrating amplifier 54 to a reference voltage Vref, like the comparator 61 does. In addition, the output of the comparator circuit gets to a third voltage level when the output voltage Vout of the integrating amplifier 54 is greater than the reference voltage Vref and the rate of change of the output voltage Vout varies remarkably. In this case, a judging section 62 connected to the output of the comparator circuit in the radiation detecting section 59 is configured to output an end-of-radiation detecting signal to the controller 53 when it receives the third voltage subsequent to the second voltage from the comparator circuit.

Thus, the radiation detecting section 59 inputs the end-of-radiation detecting signal to the controller 53 when it detects that the x-ray radiation is terminated, as indicated by an arrow TB. Upon receipt of the end-of-radiation detecting signal, the controller 53 immediately applies the reset pulse RST to the integrating amplifiers 54, as indicated by an arrow Pd, to reset the integrating amplifiers 54. At the same time, the controller 53 switches the electronic cassette 13 to the reading operation.

Proceeding to the reading operation immediately after the detection of x-ray radiation (the end-of-radiation time TB) may reduce time T5 from the end of x-ray radiation to the start of the reading operation less than the maximum radiation time T1. Therefore, the amount of dark charges accumulated in the pixels 39 from the end of x-ray radiation to the start of the reading operation will be reduced in comparison with the above first and second embodiments. As a result, the noises overlaid on the x-ray image data may be reduced.

In the above embodiments, the radiation detecting section 59 may be connected to at least one of the signal lines 38, and it is possible to provide individual radiation detecting sections for the respective signal lines 38. In a case where a single or a few radiation detecting sections 59 are provided, it is preferable to connect the radiation detecting section or detectors 59 at least to a signal line 38 that extends in the center zone of the imaging area, because the radiography can be executed while limiting the x-ray radiation range to a narrow central area of the entire imaging area of the FPD 21. Providing multiple radiation detecting sections 59 will enable detecting the start of x-ray radiation even if the electronic cassette 13 is badly positioned relative to the x-ray source 12 so that the x-ray irradiated position greatly deviates from the imaging area, or even in a case where x-ray transmittances differ from site to site of the test subject.

In the above first to third embodiments, the FPD 21 is a flat panel detector of direct conversion type, but the FPD 21 may alternatively be an indirect conversion type panel that detects x-rays after converting to light through a scintillator or the like. However because the direct conversion type panel can detect the leak charges better than the indirect conversion type, it is more preferable to use the direct conversion type as the FPD 21.

Although the above first to third embodiments have been described with regard to the radiographic imaging detector for x-rays, the present invention is applicable to those radiographic imaging detectors using other kinds of radioactive rays such as y-rays.

In the above first to third embodiments, the pixels 39 are sequentially reset during the standby operation. However, the pixels 39 may not necessarily be reset during the standby operation, or the resetting of the pixels 39 may be done simultaneously during the standby operation. Alternatively, the pixels 39 may be reset first when the start preparation-for-imaging command is entered during the standby operation. In that case, the cassette 13 may proceed to the radiation detecting operation after making a predetermined number of times of resetting operations of the pixels 39 upon the start preparation-for-imaging command.

Although the present invention has been described with respect to those embodiments where the radiographic image detector is a portable electronic cassette, the present invention is applicable to an immovable radiographic imaging system where the FPD is affixed to an examination table or the like. However, portable image detectors like the electronic cassette need the function to detect the start of x-ray radiation by themselves more than the fixed image detectors, because the portable image detectors shall be used in combination with different x-ray sources.

It should be understood that the embodiments of the present invention have been disclosed for illustrative purposes only. Those skilled in the art will appreciate that various modifications, additions and substitutions are possible without departing from the scope and spirit of the invention as disclosed in the accompanying claims.

What is claimed is:

1. A radiographic image detector comprising:
an imaging device for detecting a radiographic image of a subject from radioactive rays that penetrate through the subject after being radiated from a radiation source, said imaging device having an imaging area in which pixels are arranged in a matrix to accumulate signal charges corresponding to incident amounts of the radioactive rays therein, and scanning lines for driving said pixels and signal lines for reading out the signal charges from said pixels to output the radiographic image are provided in correspondence with lines and columns of said pixels respectively;
a driving device for outputting drive signals to said scanning lines to turn switching elements of said pixels ON and OFF to execute a pixel resetting operation, a charge accumulating operation for accumulating the signal charges in said pixels, and a first and a second reading operations, said switching elements being turned ON in said pixel resetting operation to read out dark charges through said signal lines, the dark charges being generated in said pixels regardless of the radioactive rays, said switching element being turned OFF in said charge accumulating operation, charge leaks from said pixels to said signal lines while said switching elements are OFF being read out in said first reading operation, and said switching element being turned ON in said second reading operation to read out the signal charges through said signal lines for each line of said pixels, the amount of the charge leaks corresponding to the dark charges and the signal charges accumulated in said pixels;
a radiation detecting device for making a radiation detecting operation for detecting the start of radiation of the radioactive rays by said first reading operation; and
a control device for controlling said radiation detecting device and said driving device to start said radiation detecting operation by turning said switching elements OFF before starting said charge accumulating operation, and to start said second reading operation after said radiation detecting device detects the start of radiation of the radioactive rays and the charge accumulating operation is ended,
wherein each of said pixels includes a single one of said switching elements that is connected to one of said scanning lines and one of said signal lines, and
wherein each of said switching elements is directly connected to one of said scanning lines and one of said signal lines.

2. The radiographic image detector as recited in claim 1, wherein said control device controls said driving device to periodically execute said first reading operation and said pixel resetting operation after said first reading operation during said radiation detecting operation.

3. The radiographic image detector as recited in claim 2, wherein in case of said radiation detecting device detecting the start of radiation of the radioactive rays during said first reading operation, said control device switches said driving device to said charge accumulating operation without executing said pixel resetting operation.

4. The radiographic image detector as recited in claim 2, wherein said switching elements are simultaneously turned ON to reset all pixels at once in said pixel resetting operation during said radiation detecting operation.

5. The radiographic image detector as recited in claim 2, wherein an interval between said periodical pixel resetting operations during said radiation detecting operation, in which interval said switching elements are kept OFF, is determined to be at most equal to or less than a predetermined maximum radiation time available for said radiation source to radiate the radioactive rays continuously.

6. The radiographic image detector as recited in claim 1, wherein at least one of said signal lines is connected to an integrating amplifier that accumulates the leaked charges to output a voltage according to the accumulated amount of leaked charges.

7. The radiographic image detector as recited in claim 6, wherein said control device periodically resets the leaked charges as accumulated in said integrating amplifier during said first reading operation in said radiation detecting operation.

8. The radiographic image detector as recited in claim 6, wherein said radiation detecting device compares the output voltage of said integrating amplifier with a reference voltage to detect the start of radiation when the output voltage of said integrating amplifier gets above the predetermined reference voltage.

9. The radiographic image detector as recited in claim 1, wherein said radiation detecting device further detects the end of radiation of the radioactive rays on the basis of the charge leaks.

10. The radiographic image detector as recited in claim 9, wherein said control device switches said driving device from said charge accumulating operation to said second reading operation when said radiation detecting device detects the end of radiation of the radioactive rays.

11. The radiographic image detector as recited in claim 1, wherein the radiographic image detector is an electronic cassette including a battery for power supply.

12. The radiographic image detector as recited in claim 1, wherein the radiographic image detector is an electronic cassette including a wireless communicator for wireless communication.

* * * * *